United States Patent
Vannucci (12)

(10) Patent No.: US 6,381,464 B1
(45) Date of Patent: *Apr. 30, 2002

(54) MOBILE LOCATION ESTIMATION IN A WIRELESS SYSTEM USING DESIGNATED TIME INTERVALS OF SUSPENDED COMMUNICATION

(75) Inventor: Giovanni Vannucci, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,618

(22) Filed: Dec. 16, 1999

Related U.S. Application Data

(63) Continuation of application No. 08/898,440, filed on Jul. 22, 1997, now Pat. No. 6,021,330.

(51) Int. Cl.[7] ................................................ H04Q 7/20
(52) U.S. Cl. ...................... 455/456; 455/67.6; 342/457
(58) Field of Search ............................... 455/456, 67.6, 455/457, 440, 67.4; 342/457, 450, 464

(56) References Cited

U.S. PATENT DOCUMENTS

| | | | | |
|---|---|---|---|---|
| 5,293,645 A | * | 3/1994 | Sood | 455/67.6 |
| 5,512,908 A | * | 4/1996 | Herrick | 342/387 |
| 5,570,412 A | * | 10/1996 | LeBlanc | 342/457 |
| 5,661,652 A | * | 8/1997 | Sprague et al. | 340/825.44 |
| 5,666,662 A | * | 9/1997 | Shibuya | 455/456 |
| 5,805,200 A | * | 9/1998 | Counselman | 342/357 |
| 5,890,068 A | * | 3/1999 | Fattouche et al. | 455/456 |
| 5,960,341 A | * | 9/1999 | LeBlanc et al. | 455/426 |
| 5,970,413 A | * | 10/1999 | Gilhousen | 455/456 |
| 5,970,414 A | * | 10/1999 | Bi et al. | 455/456 |
| 6,144,858 A | * | 1/2000 | Masuda | 455/456 |
| 6,029,070 A | * | 2/2000 | Kingdon et al. | 455/456 |

FOREIGN PATENT DOCUMENTS

| | | |
|---|---|---|
| WO | WO 91/02436 | 2/1991 |
| WO | WO 95/24805 | 9/1995 |
| WO | WO 97/01228 | 1/1997 |

OTHER PUBLICATIONS

W.C. Wong et al., "Blank and Burst Transmission of Data Over Active Speech Channels," Electronics Letters, vol. 24, No. 11, pp. 670–672, May 1998.

* cited by examiner

*Primary Examiner*—William Trost
*Assistant Examiner*—Tilahun Gesesse
(74) *Attorney, Agent, or Firm*—Ryan & Mason LLP

(57) ABSTRACT

Methods and apparatus for estimating mobile location in a wireless communication system including a plurality of base stations. In a base-to-mobile embodiment, the system base stations periodically transmit location signals to mobile stations during a system-wide blank-and-burst interval during which normal wireless communications are suspended. The interval is made sufficiently short that disruption to normal operation is negligible. Each base station transmits a distinct location signal which can be identified by a mobile station as associated with a particular base station. A given mobile station for which a location estimate is to be generated detects location signals from at least three of the system base stations. The detected location signals are used to generate differential path delay measurements which may be further processed in accordance with a triangulation technique to generate an estimate of mobile location. The suspension of normal wireless communications permits the location signals to occupy a broad bandwidth corresponding to multiple voice data channels, such that high resolution differential path delay measurements can be generated. The location signals from adjacent or neighboring base stations may also be configured to appear mutually orthogonal at a receiving mobile station, such that location signals from base stations close to a mobile will not interfere with detection of a location signal from a more distant base station. For example, the location signals may be selected to have waveforms which exhibit substantially non-overlapping comb-like frequency spectra. The invention may also be implemented in partial system blanking embodiments and mobile-to-base embodiments.

38 Claims, 5 Drawing Sheets

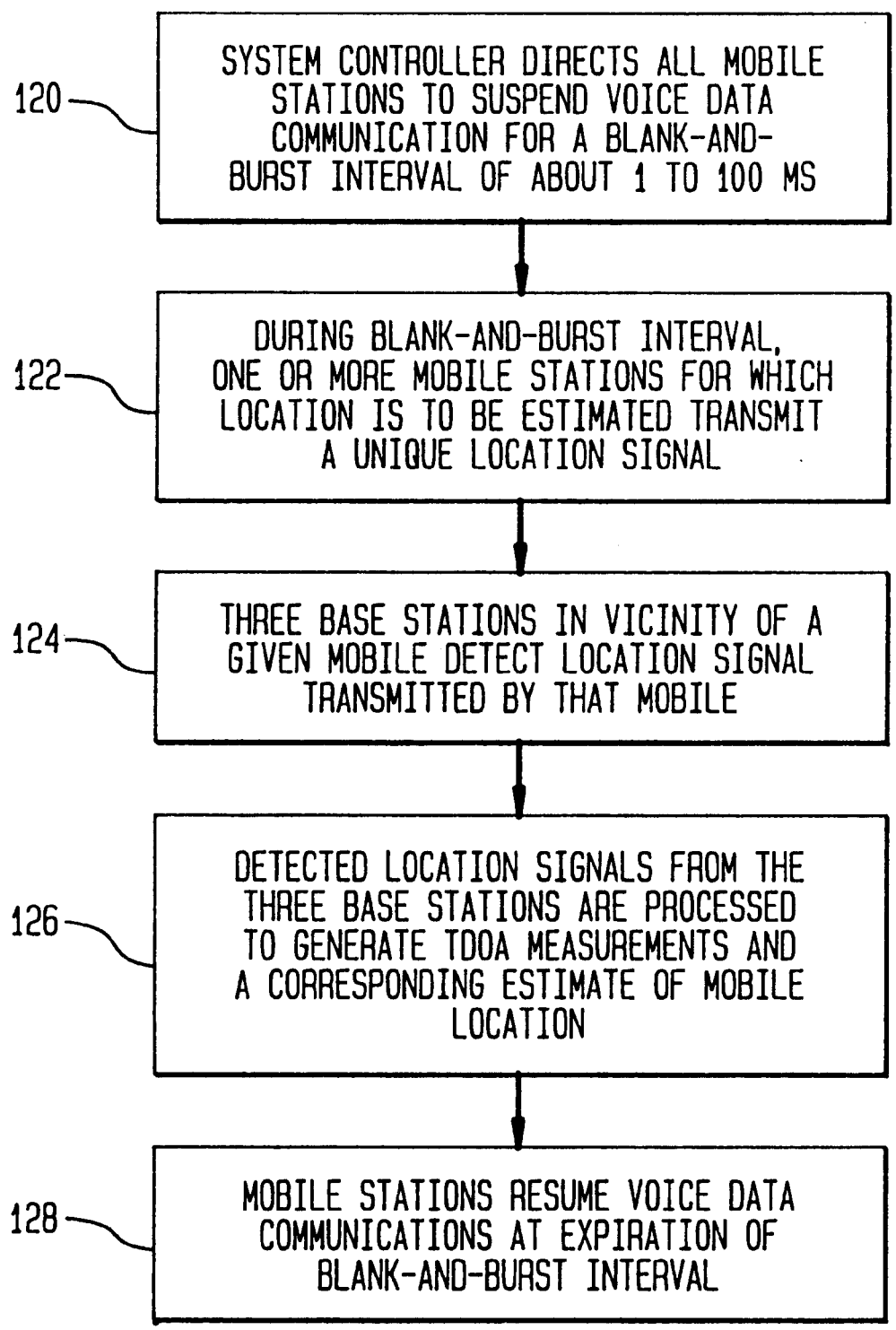

MOBILE LOCATION ESTIMATION IN A WIRELESS SYSTEM USING DESIGNATED TIME INTERVALS OF SUSPENDED COMMUNICATION

This application is a continuation of application Ser. No. 08/898,440, filed Jul. 22, 1997 now U.S. Pat. No. 6,021,330.

FIELD OF THE INVENTION

The present invention relates generally to cellular, personal communication services (PCS) and other wireless communication systems, and more particularly to techniques for estimating the location of a mobile telephone or other mobile communication station in such systems.

BACKGROUND OF THE INVENTION

Demand for wireless communication services, such as mobile telephone services in cellular and PCS systems, is continually increasing. An important issue in wireless communication systems involves the estimation of mobile station location. For example, the Federal Communications Commission (FCC) has requested that all cellular and PCS systems eventually include emergency 911 caller location capabilities similar to those provided in wired systems. As noted in Radio Communications Report, Vol. 15, No. 51, Dec. 16, 1996, the FCC has required that Phase I of a wireless emergency 911 (E-911) system providing a 911 agent with caller number and cell site location must be completed by Apr. 1, 1998, while Phase II of the E-911 system providing caller latitude and longitude within a radius of no more than 125 meters in at least 67% of all cases must be completed by Oct. 1, 2001. A number of other services requiring mobile location estimation are also being considered, including routing guidance services, fleet management and other commercial services. A wireless system which is able to determine the position of a given mobile station in an efficient manner could thus provide an enhanced level of service to the user, while meeting the above-noted FCC requirements and also generating additional revenue for the service provider.

Many conventional techniques for estimating mobile location in a wireless system are based on time difference of arrival (TDOA) measurements, which involves measuring the difference in arrival time of signals transmitted to or from different locations in the system. When implemented in the base-to-mobile direction, TDOA location estimation involves the mobile station detecting signals transmitted from at least three surrounding base stations. When implemented in the mobile-to-base direction, TDOA location estimation involves at least three surrounding base stations detecting a location signal transmitted from the mobile station. In either case, the resulting signal arrival time information can then be processed using well-known relationships to derive an estimate of mobile location. Three base stations are generally required in order to estimate mobile location in two dimensions. Differential range values may be computed by multiplying the TDOA differential path delay measurements by the speed of light c to provide an estimate of the differential distance between the mobile station and any pair of the three base stations. Each differential range defines a hyperbola having its foci at the corresponding base stations, such that the mobile location may be estimated as the intersection of three hyperbolas associated with the three pairs of base stations. A two-dimensional mobile station location estimate $(x_0, y_0)$ may be generated by solving equations for the hyperbolas using differential range values computed for the first and second, first and third and second and third base stations. Additional details regarding these and other conventional location estimation techniques may be found in, for example, J. Caffery et al., "Radio Location in Urban CDMA Microcells," Proceedings of PIMRC '95, pp. 858–862, IEEE, 1995, and M. Wylie et al., "The Non-Line of Sight Problem in Mobile Location Estimation," ICUPC '95, Boston, Mass., 1995, both of which are incorporated by reference herein.

Regardless of the manner in which the differential range values are processed to determine mobile location, the TDOA location estimation process is often complicated by the limited bandwidth available for the time difference measurements. In general, a wider bandwidth provides a more accurate arrival time measurement for a given location signal. The multipath environment in which many wireless systems operate further complicates the measurements. The arrival time of interest for a given location signal is that corresponding to the most direct path between a transmitter and receiver. This arrival time will be delayed by an amount of time proportional to the distance or range between the transmitter and receiver, and is therefore useful in location estimation. The signals carried by other non-direct paths can be regarded as a form of noise. Another source of impairment is additive noise due to interference from other mobile stations or base stations. For example, when a mobile station is within about one-fourth of a cell radius of a given base station, a location signal transmitted from or received by that base station can be as much as 35 dB stronger an the corresponding signal associated with the third nearest base station. Moreover, in wireless systems based on the IS-95 standard, the weaker signals will generally occupy the same frequency band as the stronger signals. In the same band there will also be signals transmitted to or received from other mobile stations, further degrading the signal-to-interference ratio (SIR). Under these conditions, successful reception of the weaker location signals becomes increasingly difficult as the mobile gets closer to a given base station.

It is therefore important that a system with TDOA-based mobile location estimation provide sufficient bandwidth to discriminate a desired direct path location signal from the unwanted multipath signals, and sufficient signal-to-noise ratio (SNR) to enable the possibly very weak direct path signal to be detected in the presence of interference from other mobiles or base stations. Unfortunately, calculations indicate that the 1.25 MHz bandwidth typical of a given IS-95 communication channel is not adequate to achieve the desired TDOA accuracy. For example, a bandwidth of about 10 MHz would typically be required to provide a 100 ns resolution for the TDOA measurements. In addition, the fact that many IS-95 system base stations utilize the same frequency bands also makes the available SNR inadequate. Application of conventional TDOA-based mobile location estimation techniques to IS-95 and other CDMA wireless systems may therefore require alteration of basic system parameters, thereby increasing the cost and complexity of the system and possibly degrading system performance in terms of interference and voice quality.

As is apparent from the above, a need exists for a mobile location estimation technique which provides a broader bandwidth and enhanced SNR for transmitted location signals, without altering basic system operating parameters, without requiring substantial additional mobile station and base station circuitry, and without significantly degrading voice quality and other performance measures in the wireless system.

SUMMARY OF THE INVENTION

The present invention provides methods and apparatus for mobile location estimation in a wireless communication system. An exemplary base-to-mobile embodiment of the invention involves the transmission of location signals during periodic system-wide blank-and-burst intervals in which voice data communications and other on-going wireless communications are temporarily suspended. For example, a subset of the base stations of the wireless system may each transmit a distinct location signal during the blank-and-burst interval. The blank-and-burst interval may be selected to have a duration of about 1 to 100 milliseconds such that voice quality and other system performance measures are not significantly degraded. A particular mobile station for which a location estimate is to be generated may then detect the three distinct location signals from nearby base stations, and generate TDOA differential path delay measurements which are used in triangulation or another suitable technique to generate the location estimate.

The location signals transmitted during the blank-and-burst interval in this exemplary base-to-mobile embodiment may occupy the bandwidth of multiple channels of the system, and will thus have a broader bandwidth than would otherwise be possible using conventional techniques. The location signals may be configured using predetermined waveforms which carry no information other than that provided by the waveform itself. In addition, the location signals may be selected so as to appear mutually orthogonal at a receiving mobile station, such that the SNR of the location signals during the blank-and-burst interval is substantially increased. One possible technique for ensuring mutually orthogonal location signals involves selecting the signal waveforms such that the signals exhibit substantially non-overlapping comb-like frequency spectra. Other techniques may also be used to generate mutually orthogonal location signals in accordance with the invention. For example, in an IS-95 or other similar system in which base stations transmit a pilot signal for synchronization purposes, the pilot signals may be used as location signals. The orthogonality feature is provided in such an embodiment if the mobile station receiver integrates the received signal over a time interval that is a multiple of the repetition period of the pilot signals. Some or all of the base stations could therefore suspend all communications during the blank-and-burst interval except for transmission of the pilot signal.

An alternative implementation of the above-described base-to-mobile embodiment may blank only a portion of the total bandwidth utilized by the wireless system. Such an implementation is particularly well-suited for use in channelized wireless systems such as the Advanced Mobile Phone System (AMPS) and IS-136. For example, an embodiment may be configured in which only every fourth channel can be used for mobile location estimation, in order to preserve three-fourths of the system bandwidth for uses unrelated to location estimation during any given blank-and-burst interval. This partial blank-and-burst technique may be implemented in a CDMA system by applying a suitable notch filter to an otherwise normal CDMA signal prior to its transmission during the blank-and-burst interval. The notch filter will generally not affect portions of the CDMA signal used for other purposes, but frees up the portion of the bandwidth needed to transmit the base-to-mobile location signals.

The invention may also be implemented in a mobile-to-base embodiment in which at least a subset of all system mobile stations are directed to terminate ordinary voice data communication functions for a short blank-and-burst interval on the order of 1 to 100 milliseconds. A system controller then directs one or more mobile stations to transmit a location signal during the interval. The location signal has an identifying characteristic, such as a particular one of a number of different possible comb-like frequency spectra, which associates it with its corresponding mobile station. The location signal is received by at least three base stations in the vicinity of the transmitting mobile station, and the various detected versions of the transmitted location signal are processed to generate an estimate of mobile location. As in the base-to-mobile embodiments, the location signals in this mobile-to-base embodiment may be configured to occupy a broad bandwidth, such as the bandwidth normally occupied by multiple channels of the wireless system. The system controller may assign particular types of location signals to be used by particular mobile stations for a given blank-and-burst interval so as to preserve the above-described appearance of mutual orthogonality for that interval. The location signal assignments may differ from interval to interval depending on which mobiles will be using the location estimation feature. At the expiration of the system-wide blank-and-burst interval, the system mobile stations resume normal voice data communications.

The present invention provides mobile location estimation in a manner which permits location signals to be transmitted with a substantially broader bandwidth and increased SNR than conventional techniques. Moreover, the improvements are provided without the need for significant alteration in basic system operating parameters or large amounts of additional base station or mobile station circuitry, and without significantly degrading voice quality or other system performance measures. These and other features and advantages of the present invention will become more apparent from the accompanying drawings and the following detailed description.

BRIEF DESCRIPTION OF THE DRAWINGS

FIG. 6 is a flow diagram illustrating a mobile location estimation process implemented in the mobile-to-base direction in accordance with an exemplary embodiment of the invention.

DETAILED DESCRIPTION OF THE INVENTION

The present invention will be illustrated below in conjunction with an exemplary IS-95 wireless communication system. It should be understood, however, that the invention is not limited to use with any particular type of system, but is instead more generally applicable to any wireless system in which it is desirable to provide a broader bandwidth and higher SNR for location estimation signals without altering the basic system operating parameters or significantly degrading system performance. For example, although the techniques are illustrated with reference to IS-95 code division multiple access (CDMA) personal communications service (PCS) and cellular systems, it will be apparent to those skilled in the art that the techniques are also applicable to other CDMA wireless systems, as well as narrowband analog and time division multiple access (TDMA) wireless systems. The term "primary base station" as used herein refers generally to a base station communicating directly with a given mobile station, such as the base station handling an on-going call for the mobile station. The term "location signal" refers to a signal, having certain identifiable characteristics, which is used to generate path delay information for estimating mobile location. In a base-to-mobile embodiment, a location signal is generated by a base station and detected by a mobile station, and in a mobile-to-base embodiment a location signal is generated by a mobile station and detected by a base station. A location signal may be a signal which is also used for other purposes in the system, such as a pilot signal generated by a base station. The term "system-wide" as used herein is intended to include operations which involve at least a subset of the total number of base stations or mobile stations of a given wireless system. The terms "time interval" or "blank-and-burst interval" refer to a period of time during which at least a subset of the base stations or mobile stations of a wireless system suspend certain normal communication operations in order to transmit location signals which may be detected and used in location estimation. For example, a base station communicating user voice data over multiple channels may suspend communication of the voice data for the duration of the blank-and-burst interval, such that a location signal may be transmitted during the interval using the full bandwidth of the multiple channels. It should be noted that certain other types of base station and mobile station communications may not be suspended during a given blank-and-burst interval. For example, any communications which utilize a portion of the system bandwidth which is not occupied by a location signal during the blank-and-burst interval may continue during that interval.

Figure 1:
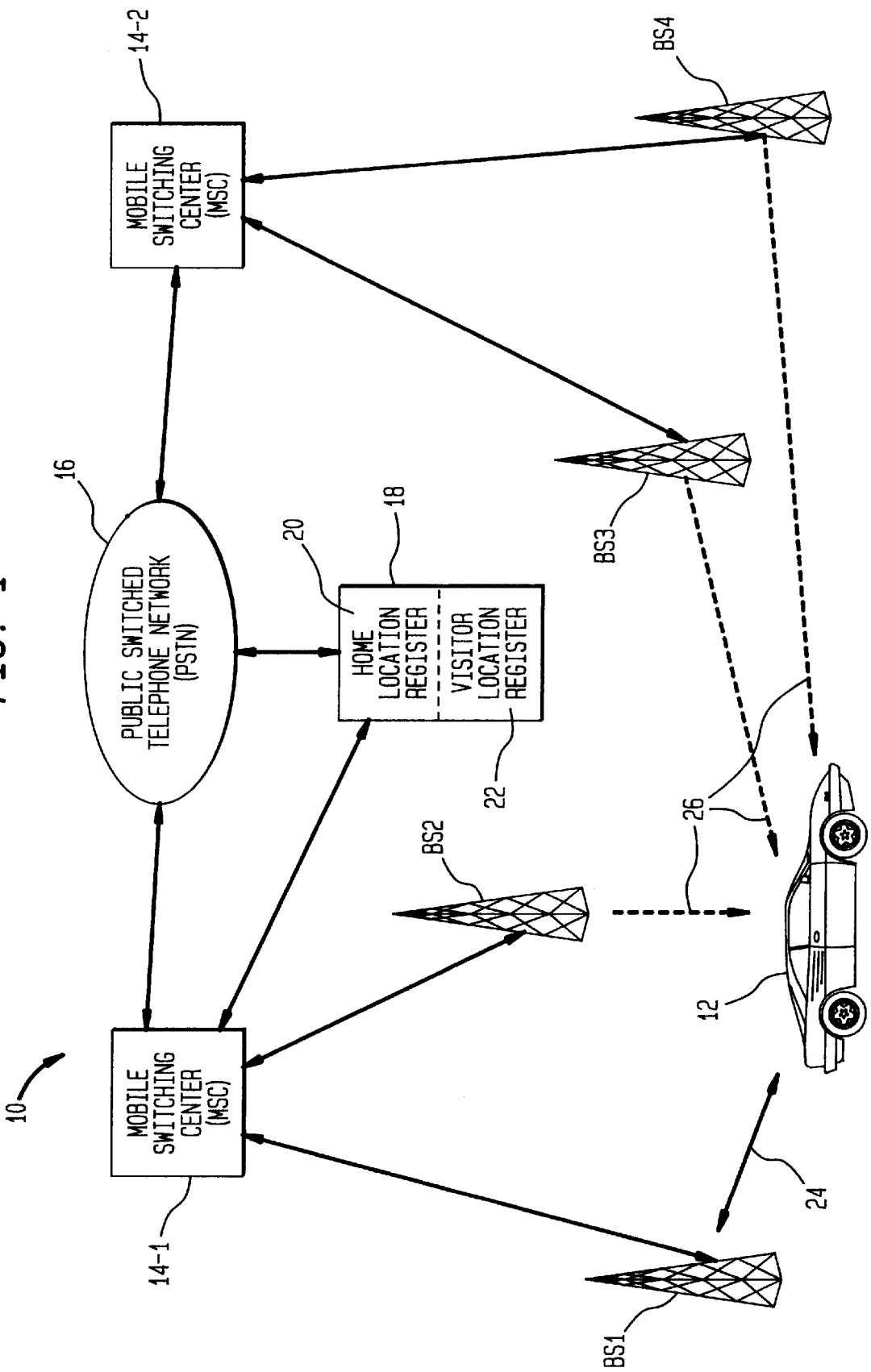
FIG. 1 shows an exemplary code division multiple access (CDMA) wireless communication system in which the mobile location estimation techniques of the present invention may be implemented.

FIG. 1 shows an exemplary cellular or PCS wireless communication system 10. The system 10 is configured in accordance with TIA/EIA/IS-95A, "Mobile Station—Base Station Compatibility Standard for Dual-Mode Wideband Spread Spectrum Cellular System," June 1996, TIA/EIA/IS-97A, "Recommended Minimum Performance Standards for Base Station Supporting Dual-Mode Wideband Spread Spectrum Cellular Mobile Stations," June 1996, and TIA/EIA/IS-98A, "Recommended Minimum Performance Standards for Dual-Mode Wideband Spread Spectrum Cellular Mobile Stations," June 1996, and ANSI J-STD-008, "Personal Station—Base Station Compatibility Requirements for 1.8 to 2.0 GHz Code Division Multiple Access (CDMA) Personal Communication Systems," all of which are incorporated by reference herein. The system 10 as shown includes a mobile station (MS) 12 and a number of base stations BS1, BS2, BS3 and BS4. The base station BS1 of FIG. 1 represents a primary base station, communicating directly with mobile station 12 via the path designated by solid two-way arrow 24. This communication path may also be used to transmit a location signal as part of a mobile location estimation process as will be described in greater detail below. The other base stations BS2, BS3 and BS4 may serve as secondary base stations in a mobile location estimation process by generating additional location signals transmitted via the paths indicated by dashed one-way arrows 26, or by receiving a location signal from the mobile station in a mobile-to-base embodiment.

The primary base station BS1 communicates voice data to and from the mobile station 12 using CDMA techniques described in the above-cited standards documents. As the mobile station 12 moves within the system 10, handoffs may occur such that base stations other than BS1 become primary base stations for communicating voice data with the mobile station 12. The system 10 also includes first and second mobile switching centers (MSCs) 14-1 and 14-2. A given MSC typically connects several base stations with a public switched telephone network (PSTN) 16. In this exemplary embodiment, MSC 14-1 connects base stations BS1 and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10. The operation of elements 14-1, 14-2, 16, 18, 20 and 22 of system 10 is well understood in the art and will therefore not be further described herein.

The present invention makes use of the fact that most wireless systems are designed to withstand a short-duration loss of signal or "dropout." Such dropouts are a common occurrence in narrowband analog systems due to multipath fading, and also occur in broader bandwidth digital systems such as the IS-95 CDMA system. If the dropout duration is very short, for example, about 100 ms or less, its disruption to an on-going telephone conversation is barely detectable. In an analog system, a user may hear a weak click during a dropout, while in a digital system a voice decoder may be used to fill in the missing voice data with computed data in order to make the sound flow smoothly. An artificial dropout technique known as "blank-and-burst" is commonly utilized in cellular systems. This technique generally involves a base station temporarily replacing a normal transmitted channel signal with another signal that carries special types of information to or from the mobile station.

In an exemplary embodiment, the present invention provides a "system-wide" blank-and-burst mobile location technique in which multiple base stations of a wireless system each suspend normal voice data communications and transmit a distinct location signal for the duration of a common time interval. The interval is limited in duration to about 100 ms in order to minimize the degradation in voice quality attributable to the suspension of voice data communications. As noted above, suspension for an interval of about 100 ms will generally produce only a slight audible click in an analog system, and even less of an apparent degradation in a digital system. Each of the distinct location signals of the system base stations may then be configured to utilize a broad bandwidth covering multiple voice data channels for which communication has been suspended during the blank-and-burst interval, such that a high level of accuracy is obtained for subsequent TDOA differential path delay measurements. In addition, the distinct channel signals may be arranged so as to appear mutually orthogonal at the mobile receiver. For example, the location signals may be selected as mutually orthogonal signals having substantially non-overlapping comb-like frequency spectra. This eliminates the problem of interference from base stations close to a mobile disrupting reception of a location signal from a more distant base station. The present invention thus provides a substantially higher SNR at the receiving mobile than that achievable with conventional techniques.

Figure 2:
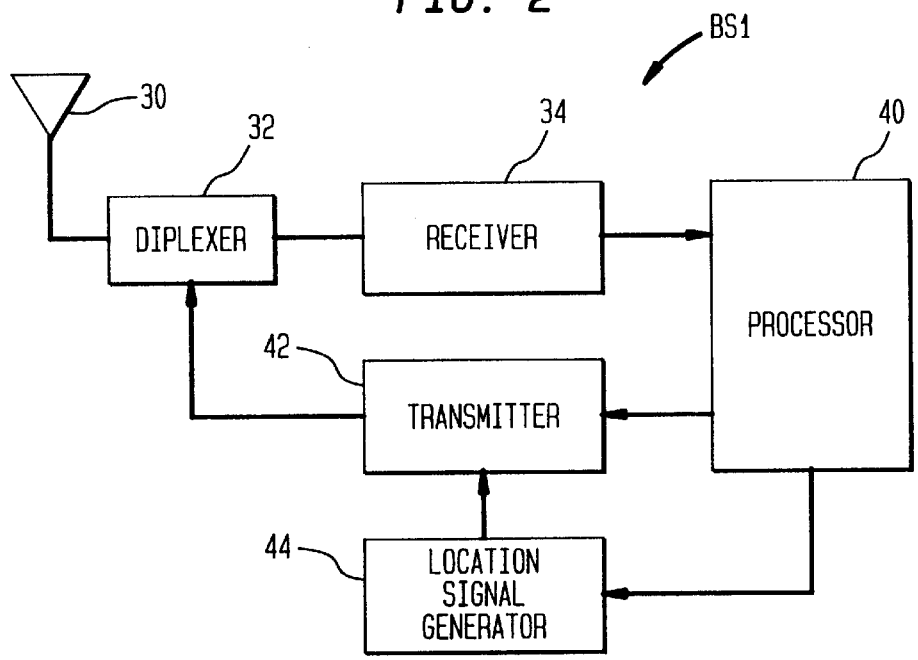
FIG. 2 is a block diagram of a base station configured in accordance with an exemplary embodiment of the present invention.

FIG. 2 shows an exemplary implementation of base station BS1 of FIG. 1 in accordance with the present invention. The base station BS1 includes an antenna 30 for receiving signals from and directing signals to mobile stations of the wireless system. A signal received from a mobile station is filtered by a diplexer filter 32 and directed to a receiver 34. In a mobile-to-base embodiment of the invention, to be described in conjunction with FIG. 6 below, the receiver 34 may be configured to include a location signal detector for detecting a location signal transmitted from a mobile station. In the base-to-mobile embodiment of FIG. 2, the receiver 34 preamplifies, downconverts and demodulates the received signal, and supplies the demodulated data to a base station processor 40. The processor 40 is also used to process transmission data which is supplied to a transmitter 42. The transmitter 42 performs operations such as modulation, upconversion and power amplification, and delivers the resulting transmission signal to the antenna 30 via the diplexer filter 32. The base station BS1 also includes a location signal generator 44 which has an output coupled to the transmitter and an input coupled to an output of the processor 40. During a system-wide blank-and-burst interval in accordance with the present invention, the processor 40 directs the location signal generator 44 to generate or otherwise deliver a unique location signal $S_1(t)$ to the transmitter 42. The location signal $S_1(t)$ generated in the base station BS1 of FIG. 2 may be supplied to transmitter 42 on a radio frequency (RF) carrier such that the signal $S_1(t)$ need only be amplified in a transmitter power amplifier and supplied to antenna 30 via diplexer 32. Alternatively, the location signal generator 44 may generate a lower-frequency version of the location signal which is upconverted in the transmitter 42 to generate the transmitted location signal $S_1(t)$. The processor 40 may be implemented as a microprocessor, central processing unit, computer, application-specific integrated circuit (ASIC) or other digital data processor, as well as suitable portions or combinations thereof.

The location signal $S_1(t)$ generated by base station BS1 during the blank-and-burst interval has certain unique characteristics, such as a particular type of frequency spectrum, which identify it as being associated with the base station BS1. Other location signals generated by other system base stations during the blank-and-burst interval are similarly associated with their corresponding base stations. As will be described in greater detail in conjunction with FIG. 4 below, the location signal generated by base station BS1 or another system base station may have a signal waveform which is fully specified a priori and therefore communicates no information other than that provided by the waveform itself. The waveform of the location signal $S_1(t)$ generated by base station BS1 is precisely timed to be generated at a particular time relative to the location signals generated by other base stations, such that the location signals detected in a mobile station may be used to generate TDOA differential path delay measurements. In addition, the location signals generated by multiple system base stations may be configured to appear mutually orthogonal at a receiving mobile station in order to reduce interference and increase the SNR.

In the above-described embodiment, the location signal waveforms are fully specified a priori. However, in alternative embodiments the location signals may be used to convey information while retaining the desirable characteristics noted above that make them suitable for location estimation. For example, the Global Positioning System (GPS) is based on a system of satellites that broadcast signals that are optimized for location but also carry information related to the task of locating the unit that receives the signals. A similar arrangement could be incorporated into an embodiment of the present invention.

The base station BS1 temporarily suspends normal voice data communications for the relatively short duration of the blank-and-burst interval, such that the bandwidth of multiple voice data channels is made available for the transmission of the location signal $S_1(t)$. This broader location signal bandwidth allows TDOA measurements to be performed with a resolution on the order of 100 ns. For example, it was noted above that the 1.25 MHz bandwidth of a single IS-95 voice data channel is generally insufficient to provide a TDOA measurement resolution on the order of 100 ns. The location estimation techniques of the present invention, however, generate a location signal which can occupy multiple voice data channels. The maximum contiguous available bandwidth in a given wireless system can therefore be used for the periodic transmission of location signals. This maximum contiguous bandwidth is about 5 MHz or 15 MHz in PCS systems, depending on the spectrum allocation, and about 10 MHz in cellular systems. These relatively broad location signal bandwidths improve the ability of the receiving mobile station to discriminate between a desired direct path version of a given location signal and the unwanted multipath versions of the location signal. A bandwidth of 10 MHz will allow TDOA measurements to be performed with a resolution on the order of 100 ns.

Figure 3:
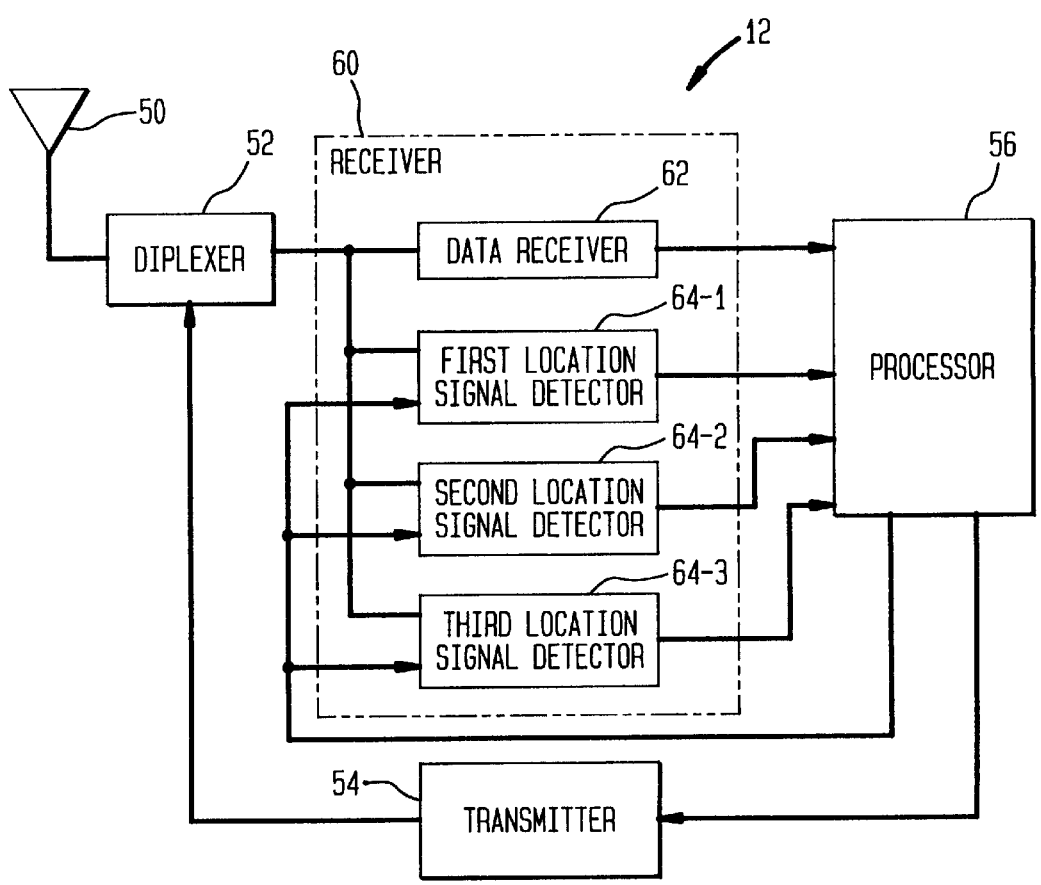
FIG. 3 is a block diagram of a mobile station configured in accordance with an exemplary embodiment of the present invention.

FIG. 3 shows an exemplary implementation of the mobile station 12 of FIG. 1 in accordance with the present invention. The mobile station 12 includes an antenna 50 for receiving signals from and directing signals to base stations of the wireless system. A signal to be transmitted to a base station is supplied to the antenna 50 from a transmitter 54. The transmitter 54 performs operations such as modulation, upconversion and power amplification, and delivers the resulting transmission signal to the antenna 50 via a diplexer filter 52. The transmitted signal generally carries data supplied or processed by a mobile station processor 56. Signals received by antenna 50 are supplied via diplexer filter 52 to a receiver 60 which includes a data receiver 62 and first, second and third location signal detectors 64-1, 64-2 and 64-3. The data receiver 62 preamplifies, downconverts and demodulates a received data signal, and supplies the demodulated data to the mobile station processor 56. In a mobile-to-base embodiment of the invention, to be described in conjunction with FIG. 6 below, the mobile station of FIG. 3 may be configured such that the transmitter 54 transmits a location signal generated by a location signal generator in the mobile station.

The first, second and third location signal detectors 64-1, 64-2 and 64-3 are each designed to detect a different location signal generated by a particular base station during a system-wide blank-and-burst interval in accordance with the present invention. Although only three location signal detectors are shown in FIG. 3 for simplicity of illustration, it should be understood that the mobile station may include more than three location signal detectors because it does not know a priori which three base stations are nearest. For example, several detectors may be implemented as software in a digital signal processor, such that many location signals could be detected simultaneously, and the characteristics of the detectors could be altered depending upon which base stations are nearest to the mobile.

The processor 56 may thus control operating parameters of the location signal detectors 64-1, 64-2 and 64-3 such that the detectors attempt to detect the waveforms of location signals $S_1(t)$, $S_2(t)$ and $S_3(t)$ associated with respective first, second and third base stations. These first, second and third base stations may include three base stations relatively close to the mobile station 12, such as the base stations BS1, BS2 and BS3 of FIG. 1. One of the base stations may be a primary base station, such as base station BS1, which is in the process of communicating voice data to and from the mobile station 12 as part of an on-going call. The processor 56 identifies three base stations from which the mobile station 12 should attempt to detect location signals during the interval, and configures each of the detectors 64-1, 64-2 and 64-3 to detect a waveform having the a priori characteristics associated with one of the three base stations. As noted previously, the location signals $S_1(t)$, $S_2(t)$ and $S_3(t)$ are designed to appear mutually orthogonal at the mobile station 12. This ensures that the location signal generated by the base station closest to the mobile will not interfere with the detection of a weaker location signal generated by a more distant base station.

The processor 56 may utilize information transmitted from a particular base station to facilitate its determination of an appropriate set of parameters for the detectors 64-1, 64-2 and 64-3 during a given blank-and-burst interval. This information transmitted from a base station may be utilized to configure the location signal detectors of a particular mobile station regardless of whether or not there is an on-going call in progress. Moreover, this information may be transmitted before or after the blank-and-burst interval. It may also be transmitted during the blank-and-burst interval if it is modulated onto a carrier signal configured so as not to interfere with the detection of the location signals. Alternatively, the transmitted information could be modulated onto a location signal in such a way as not to interfere with the detection of the location signal parameters needed for location signal estimation. Like the base station processor 40, the mobile station processor 56 may also be implemented as a microprocessor, central processing unit, computer, ASIC or other digital data processor, as well as suitable portions or combinations thereof.

Figure 4:
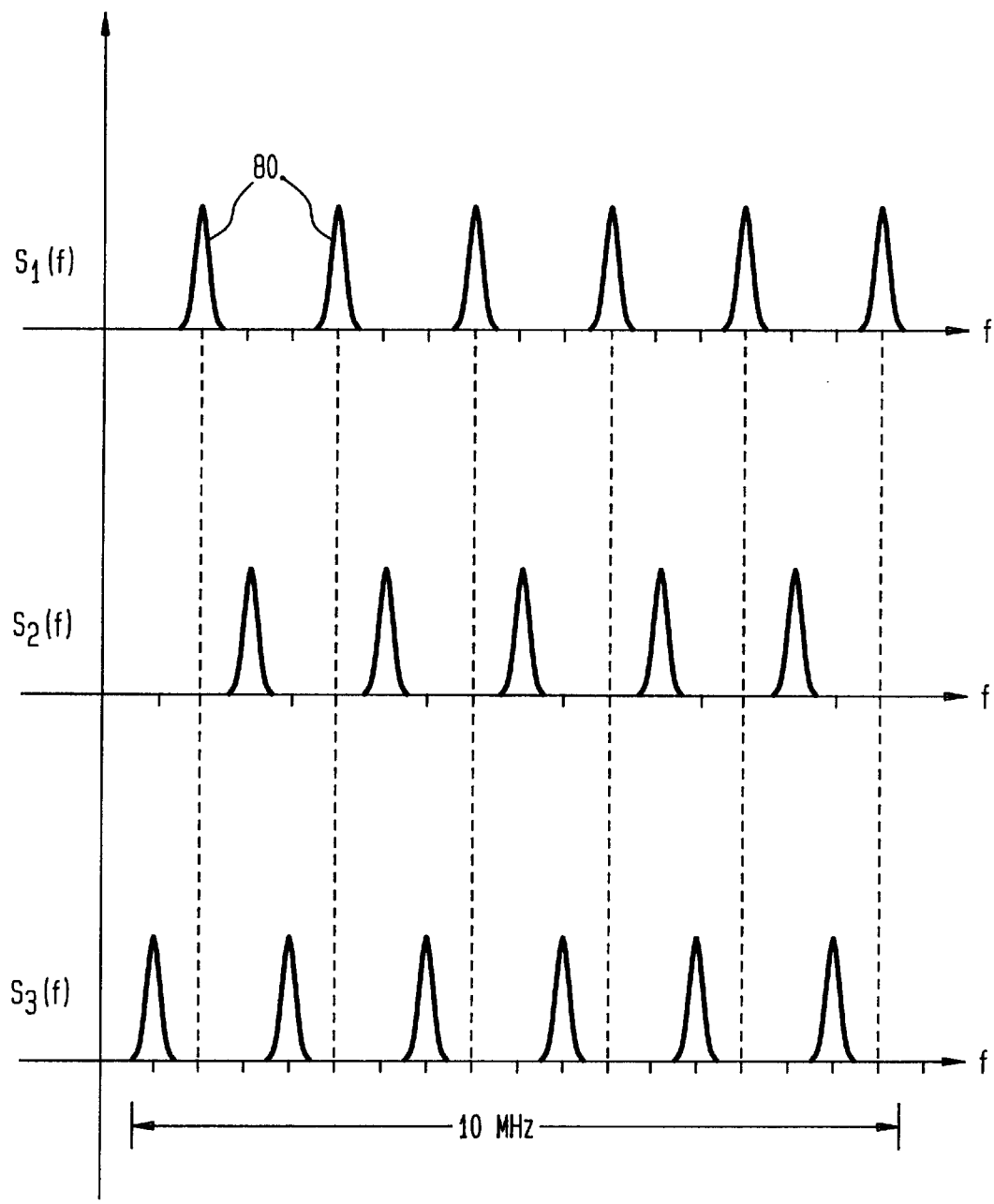
FIG. 4 shows comb-like frequency spectra of exemplary location signals suitable for use in performing a mobile location estimation process in the system of FIG. 1.

FIG. 4 shows frequency spectra $S_1(f)$, $S_2(f)$ and $S_3(f)$ of the respective first, second and third location signals $S_1(t)$, $S_2(t)$ and $S_3(t)$ to be detected in the mobile station 12 of FIG. 3. The frequency spectra in this illustrative embodiment are configured as substantially non-overlapping comb-like spectra. Each frequency spectrum $S_i(f)$ includes a comb of evenly-spaced narrow spectral lines 80. The spectral lines 80 of each of the spectra are offset from those of the other spectra such that the spectral lines do not overlap. This ensures that the location signal waveforms to be detected by a mobile station during a given blank-and-burst interval are mutually orthogonal, such that interference due to other base stations is substantially reduced and the SNR of a given location signal at the mobile station 12 is thereby considerably increased. The additive noise at the mobile station is thus limited to that of the mobile station front end plus any ambient noise that may exist in the system. It should be noted that the width of the spectral lines 80 in FIG. 4 is exaggerated for clarity of illustration. The width of a given spectral line 80 in this embodiment will typically be on the order of the inverse of the blank-and-burst interval, or about 50 Hz for a 20 millisecond blank-and-burst interval. The spacing between adjacent spectral lines 80 in a given location signal may be on the order of 100 kHz.

The location signals $S_1(t)$, $S_2(t)$ and $S_3(t)$ may also be configured to occupy the broadest possible bandwidth. Given that normal voice data communications are suspended during the relatively short blank-and-burst interval for which the location signals $S_1(t)$, $S_2(t)$ and $S_3(t)$ are transmitted, the location signals may be designed to occupy a much broader bandwidth than would otherwise be possible. As noted above, this bandwidth may be about 10 MHz for IS-95 cellular systems. The frequency spectra $S_1(f)$, $S_2(f)$ and $S_3(f)$ are therefore shown in FIG. 4 as occupying a 10 MHz bandwidth. The 10 MHz bandwidth is sufficient to provide a TDOA differential path delay measurement resolution of about 100 ns, which is adequate for many practical mobile location estimation applications. The actual amount of bandwidth utilized in a given application will generally vary depending upon the spectrum allocation of the wireless system as well as other factors. For example, although the differential path delay measurement accuracy increases with increasing location signal bandwidth, it may nonetheless be desirable in a given application to decrease the amount of bandwidth utilized by the location signals in order to reduce the cost and complexity of the detection circuitry in the mobile. It should also be noted that the use of location signals having slightly offset comb-like spectra as shown in FIG. 4 is just one example of a set of location signals which appear mutually orthogonal as seen by the receiving mobile. Numerous other types of location signals having this property may be used in alternative embodiments. For example, signals that are disjoint in time would also be orthogonal. A system using such signals could subdivide the blank-and-burst interval into several sub-intervals, and only a subset of the base stations would be allowed to transmit a location signal in each sub-interval.

An alternative embodiment of the invention is particularly well-suited for use in an IS-95 or other similar system in which each base station transmits a pilot signal for synchronization purposes. In this embodiment, a set of the pilot signals transmitted by some or all of the base stations can be used as a set of location signals because such signals can provide the desired location signal features described previously. In particular, the orthogonality feature is provided in such an embodiment if the mobile station receiver integrates the received signal over a time interval that is a multiple of the repetition period of the pilot signals. The repetition period is generally the same for all pilot signals and may be on the order of 20 ms. Therefore, the present invention may be implemented in an IS-95 or similar system wherein some or all of the base stations suspend all transmissions except for the pilot signals for a period of time long enough to include one or more whole periods of the pilot signals.

Referring again to FIG. 3, each of the location signal detectors 64-1, 64-2 and 64-3 is configured by the processor 56 to detect one of the location signals $S_1(t)$, $S_2(t)$ and $S_3(t)$ transmitted by respective first, second and third base stations of system 10. The location signal waveforms are precisely timed to occur at a predetermined time relative to the start of the blank-and-burst interval, such that the detected location signals may be used to generate TDOA differential path delay measurements. The location signal detectors 64-1, 64-2 and 64-3 may supply the detected signals to the processor 56 such that processor 56 determines an arrival time and generates the corresponding differential path delay measurement for each pair of location signals. Alternatively, the arrival times and differential path delay measurements may be generated in the signal detectors 64-1, 64-2 and 64-3. In either case, the differential path delay measurement generated from a given detected location signal provides an estimate of the delay between the corresponding base station and the mobile station. The path delay may be multiplied by the speed of light c to provide an estimate of the distance or range between the base station and the mobile. Conventional triangulation techniques may then be used to process the range values to compute an estimate of mobile location. For example, the three range values may be used to specify three hyperbolas, such that the estimate of mobile location can be computed by determining the intersection of the three hyperbolas. Any of a number of other conventional techniques may also be used. The actual mobile location estimate computation may be performed in the processor 56 of the mobile station 12, using information supplied by the system via the normal base-to-mobile communication channels. Alternatively, a mobile station which desires a location estimate can transmit the results of the differential path delay measurements to the system during or after the blank-and-burst interval. The system will then perform the necessary computations, perhaps utilizing a base station processor such as processor 40 of FIG. 2, and then transmit the resulting location estimate to the mobile over the normal base-to-mobile communication channels.

Figure 5:
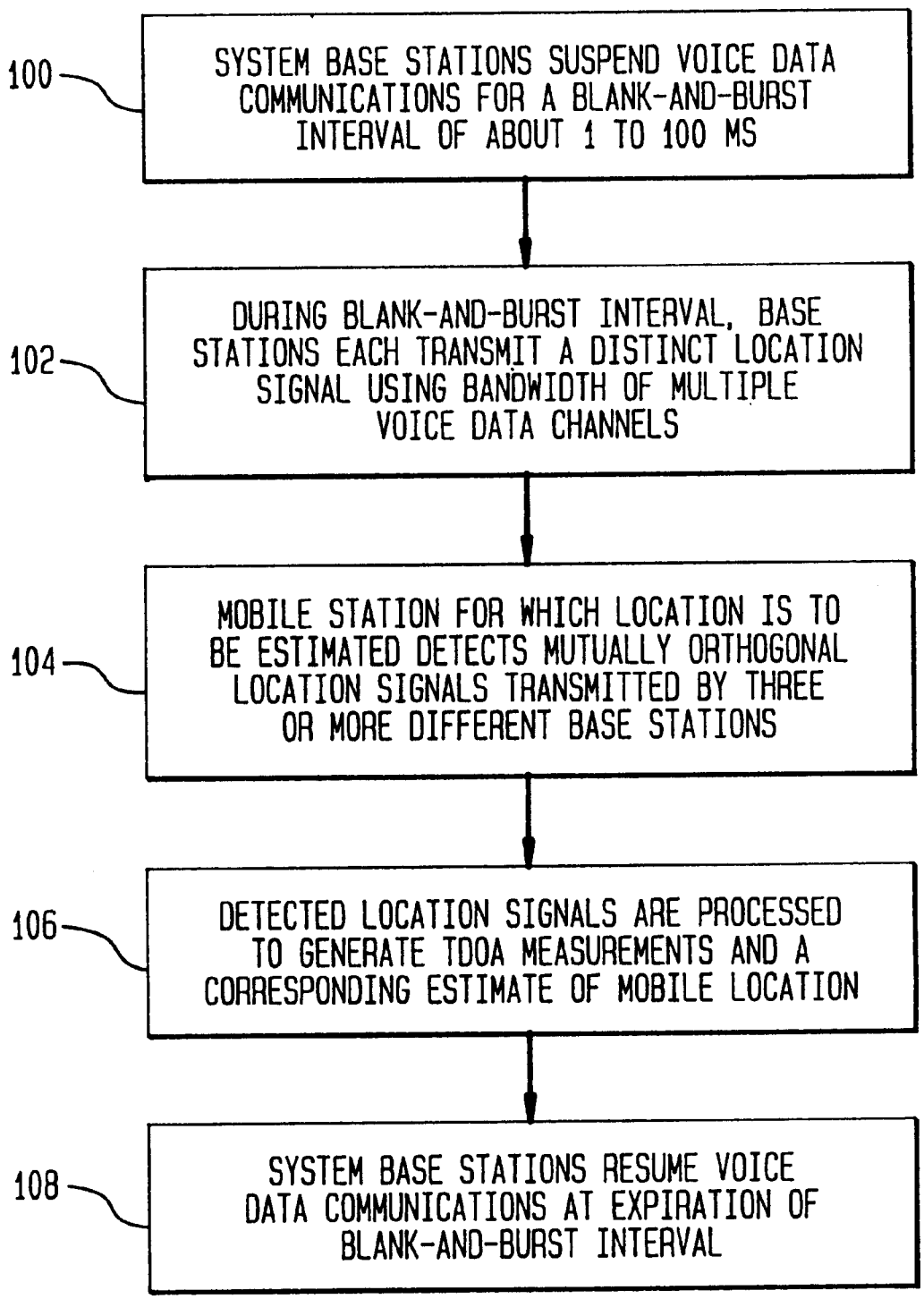
FIG. 5 is a flow diagram illustrating a mobile location estimation process implemented in the base-to-mobile direction in accordance with an exemplary embodiment of the invention.

FIG. 5 is a flow diagram illustrating a mobile location estimation process in accordance with the invention. In step 100, the mobile location estimation process is initiated when at least a subset of the system base stations suspend voice data communications for the duration of a system-wide blank-and-burst interval which may be on the order of about 1 to 100 milliseconds. The start of the system-wide blank-and-burst interval may be triggered by the expiration of a periodic timer located in a given base station and synchronized with corresponding timers in the other system base stations. This arrangement would allow all mobile stations in the system to establish their positions at regular intervals such as, for example, once every minute. Alternatively, the start of the system-wide blank-and-burst interval may be triggered in response to system commands received from a mobile or group of mobiles, with appropriate limitations to prevent excessive disruption of voice traffic. Other systems in accordance with the invention may implement a combination of periodic and command-based system-wide blank-and-burst. Regardless of the manner in which the system-wide blank-and-burst interval is initiated, each of the subset of system base stations which suspended voice data communications in step 100 proceeds to transmit its distinct location signal in step 102. This location signal has an identifying characteristic, such as a particular one of the comb-like frequency spectra shown in FIG. 4, which associates it with its corresponding base station. The location signals may be configured to occupy a broad bandwidth, such as the bandwidth normally occupied by multiple channels of the wireless system.

A mobile station for which a location estimate is to be generated detects in step 104 the distinct location signals transmitted from at least three system base stations. The mobile station location signal detectors 64-1, 64-2 and 64-3 may be configured by mobile station processor 56 to attempt to detect location signals from the three base stations expected to be closest to the mobile. Alternatively, there may be more than three location signal detectors, one for each base station that might be nearby. The mobile processor utilizes information received over normal base-to-mobile communication channels to determine the base stations from which the mobile should attempt to detect location signals. The location signals transmitted by these base stations have distinct waveforms, and therefore each location signal can be associated with a particular base station. The arrival time of a given location signal with respect to the arrival times of other location signals can thus provide a measure of differential path delay between the mobile and a corresponding pair of base stations. The location signals are arranged so as to appear mutually orthogonal at the receiving mobile, such that the operation of a location signal detector designed to detect a location signal from a relatively distant base station will not be disrupted due to interference created by the location signals of closer base stations.

The detected location signals are processed in step 106 to generate differential location signal arrival times and corresponding TDOA differential path delays for each pair of base stations whose signals can be detected by the mobile station. The differential path delays are then used in mobile processor 56, a base station processor 40 or other suitable system processor to compute an estimate of mobile station location using conventional techniques as previously described. At the expiration of the system-wide blank-and-burst interval, the system base stations resume voice data communications as shown in step 108. It should be noted that the suspension of voice data communications in step 100 may also involve the suspension of other types of base-to-mobile and mobile-to-base communications. If the location estimate of step 106 is generated in a system base station or in another processor external to the mobile station, it therefore may be necessary to wait until after the expiration of the current blank-and-burst interval to transmit measured path delay data to a base station and/or receive a computed location estimate from a base station.

An alternative implementation of the above-described base-to-mobile embodiment may blank only a portion of the total bandwidth utilized by the wireless system. Such an implementation is particularly well-suited for use in channelized wireless systems such as the Advanced Mobile. Phone System (AMPS) and IS-136. An exemplary channelized system may include on the order of 300 or more 30-kHz channels in the 10-MHz bandwidth utilized by the system. The above-described blank-and-burst techniques may then be implemented using only every fourth channel, such that three-fourths of the system bandwidth remains available for uses unrelated to location estimation during any given blank-and-burst interval. The particular number of channels used for blank-and-burst in a particular application involves a tradeoff with signal detection ambiguity, with fewer channels generally leading to more ambiguity. The additional ambiguity could be resolved using signal strength measures or other suitable ambiguity resolution techniques. This partial system bandwidth blank-and-burst embodiment may be implemented in a CDMA system by applying a suitable notch filter to an otherwise normal CDMA signal prior to its transmission during the blank-and-burst interval. The notch filter will generally not affect portions of the CDMA signal used for other purposes, but frees up the portion of the bandwidth needed to transmit the base-to-mobile location signals.

FIG. 6 is a flow diagram of an embodiment of the invention in which mobile location estimation is implemented in a mobile-to-base direction. In this embodiment, at least a subset of all system mobile stations are directed to terminate ordinary communication functions for a short blank-and-burst interval. The mobile stations are each configured to include a location signal generator such as that shown in FIG. 2, and the system base stations each include a location signal detector arranged in a manner similar to that shown in FIG. 3. A system controller then directs one or more mobile stations to transmit a location signal during the interval, at a predetermined transmitted power level, or at a transmitted power level that the primary base station communicates to the mobile station via the normal wireless channel. The location signal is received by at least three base stations in the vicinity of the transmitting mobile station, and the various detected versions of the transmitted location signal are processed to generate an estimate of mobile location. The process is illustrated in more detail in steps 120 through 128 of FIG. 6. In step 120, the mobile location estimation process is initiated when at least a subset of the system mobile stations suspend voice data communications for the duration of a system-wide blank-and-burst interval which may be on the order of about 1 to 100 milliseconds. As in the other embodiments described previously, the start of the system-wide blank-and-burst interval may be triggered by the expiration of a periodic timer located in a given base station and synchronized with corresponding timers in the other system base stations. The base stations could then transmit an indication to the mobile stations that the blank-and-burst interval is beginning. Alternatively, the start of the system-wide blank-and-burst interval may be triggered in response to system commands received from a mobile or group of mobiles. During the blank-and-burst interval, each mobile station for which location is to estimated during the interval transmits a distinct location signal as shown in step 122. This location signal has an identifying characteristic, such as a particular one of the comb-like frequency spectra shown in FIG. 4, which associates it with its corresponding mobile station. As in the base-to-mobile embodiments, the location signals in this mobile-to-base embodiment may be configured to occupy a broad bandwidth, such as the bandwidth normally occupied by multiple channels of the wireless system.

The location signal transmitted from a given mobile station for which a location estimate is to be generated is then detected in step 124 by at least three system base stations in the vicinity of that mobile station. As noted above, a suitable location signal detector may be incorporated into each of the base station receivers for detection of mobile-to-base location signals. The system controller may be used to direct three system base stations to detect a location signal from the given mobile, such that three different detected versions of the same transmitted location signal may be processed to generate an estimate of the location of the corresponding mobile, as shown in step 126. The arrival time of the location signal in a particular base station with respect to the arrival time of the same location signal in another base station can be used to provide a measure of differential path delay between the mobile and that pair of base stations. The location signals from the various mobiles may be arranged so as to appear mutually orthogonal at the receiving base station, such that the operation of a location signal detector designed to detect a location signal from a particular mobile station will not be disrupted due to interference created by the location signals of other mobile stations transmitting during the same blank-and-burst interval. The system controller may thus assign particular types of location signals to be used by particular mobile stations for a given blank-and-burst interval so as to preserve the above-described appearance of mutual orthogonality for that interval. The assignments may be different from interval to interval depending on which mobiles will be using the location estimation feature. At the expiration of the system-wide blank-and-burst interval, the system mobile stations resume voice data communications as shown in step 128. As in the previous embodiments, the suspension of voice data communications in step 120 may also involve the suspension of other types of base-to-mobile and mobile-to-base wireless communications.

The present invention provides mobile location estimation techniques which exhibit a broad location signal bandwidth and thus support high resolution TDOA differential path delay measurements on the order of 100 nanoseconds. The location signals in accordance with the invention also provide a substantially higher SNR at the receiving mobile or base stations than that achievable with conventional mobile location estimation. The broad bandwidth and high SNR insulate the resulting differential path delay measurements from the disruptive effects of multipath reception. In contrast, conventional narrowband mobile location techniques cannot easily discriminate between the arrival time of the desired direct path version of a location signal and those of unwanted multipath versions of the location signal which may be present at the receiving mobile or base station. The high SNR provided by the orthogonal location signals of the present invention make it much easier, for example, to extract the direct path version of a location signal transmitted by a relatively distant base station by substantially reducing the amount of interference which would otherwise be created by the location signals of closer base stations. Moreover, these and other advantages are provided using a relatively short blank-and-burst interval, such that voice quality and other system performance measures are not significantly degraded.

The above-described embodiments of the invention are intended to be illustrative only. In particular, it will be apparent to those skilled in the art that the blank-and-burst techniques of the invention can be applied to systems that employ location methods other than TDOA. For example, a location system based on Direction-of-Arrival (DOA) detection may use directional antennas to determine the direction from which a location signal from a mobile arrives at a base station. Alternatively, a "ranging" system, similar to a radar system, may measure the time it takes a mobile to respond to a query, which provides an estimate of the round-trip delay incurred by a radio signal while traveling from the base station to the mobile station and back. These and other location systems all rely on the detection of a radio signal that may be subject to interference due to other stations in the system utilizing the same frequency channels. Therefore, the blank-and-burst techniques of the invention can provide in DOA, ranging and other similar location systems the same advantages described above in the context of a TDOA system. These and numerous other alternative embodiments may be devised by those skilled in the art without departing from the scope of the following claims.

What is claimed is:

1. A method of estimating mobile station location in a wireless communication system, the method comprising the steps of:

transmitting during a particular time interval a location signal from a base station of the system, wherein each of a plurality of base stations of the system at least partially suspends wireless communications for at least a portion of the particular time interval during which the location signal is transmitted, such that the at least partial suspension of wireless communications facilitates detection of the location signal; and detecting the location signal in a mobile station of the wireless system to generate information for estimating the location of the mobile station.

2. The method of claim 1 wherein the transmitting step includes transmitting during the particular time interval a first location signal from a first base station, a second location signal from a second base station and a third location signal from a third base station, such that the first, second and third location signals each include a distinct characteristic identifying the corresponding base station, wherein each of the first, second and third base stations at least partially suspend wireless communications for the particular time interval during which the location signals are transmitted.

3. The method of claim 2 wherein the first, second and third base stations suspend all wireless communications with mobile stations of the system for the time interval during which the location signals are transmitted.

4. The method of claim 2 wherein the first, second and third location signals have substantially non-overlapping comb-like frequency spectra.

5. The method of claim 1 wherein the location signal is configured to appear mutually orthogonal to at least one other location signal from one other base station, as observed at the mobile station.

6. The method of claim 1 wherein the location signal is a pilot signal transmitted by the base station.

7. The method of claim 1 wherein the particular time interval during which the location signal is transmitted has a duration of about 1 ms to about 100 ms.

8. The method of claim 1 wherein the location signal includes a predetermined waveform carrying no additional information other than that provided by the waveform itself.

9. The method of claim 1 wherein the location signal includes a waveform which carries additional information.

10. The method of claim 1 wherein the location signal has a comb-like frequency spectrum.

11. The method of claim 1 wherein the location signal occupies a bandwidth normally occupied by multiple channels of the wireless system.

12. A base station for use in estimating mobile station location in a wireless communication system, the base station comprising:
   a location signal generator for generating a location signal; and
   a base station transmitter for transmitting the location signal during a particular time interval for at least a portion of which each of a plurality of base stations of the system at least partially suspends wireless communications with mobile stations of the system, such that the at least partial suspension of wireless communications facilitates detection of the location signal, and such that a particular mobile station can detect the location signal to generate information for estimating the location of the mobile station.

13. The base station of claim 12 wherein during the particular time interval a first location signal is transmitted from a first base station, a second location signal is transmitted from a second base station and a third location signal is transmitted from a third base station, such that the first, second and third location signals each include a distinct characteristic identifying the corresponding base station, wherein each of the first, second and third base stations at least partially suspend wireless communications for the particular time interval during which the location signals are transmitted.

14. The base station of claim 13 wherein the first, second and third location signals have substantially non-overlapping comb-like frequency spectra.

15. The base station of claim 12 wherein the location signal is configured to appear mutually orthogonal to at least one other location signal from one other base station, as observed at the mobile station.

16. The base station of claim 12 wherein the location signal is a pilot signal transmitted by the base station.

17. The base station of claim 12 wherein the particular time interval during which the location signal is transmitted has a duration of about 1 ms to about 100 ms.

18. The base station of claim 12 wherein the location signal includes a predetermined waveform carrying no additional information other than that provided by the waveform itself.

19. The base station of claim 12 wherein the location signal includes a waveform which carries additional information.

20. The base station of claim 12 wherein the location signal has a comb-like frequency spectrum.

21. The base station of claim 12 wherein the location signal occupies a bandwidth normally occupied by multiple channels of the wireless system.

22. A mobile station for use in estimating mobile station location in a wireless communication system, the mobile station comprising:
   a receiver for detecting a location signal transmitted by a base station of the wireless system during a particular time interval for at least a portion of which each of a plurality of base stations of the system at least partially suspends wireless communications with mobile stations of the system, such that the at least partial suspension of wireless communications facilitates detection of the location signal by the receiver; and
   a processor having an input coupled to an output of the receiver for receiving a detected location signal therefrom, and for processing the detected signal to generate information for estimating the location of the mobile station.

23. The mobile station of claim 22 wherein during the particular time interval a first location signal is transmitted from a first base station, a second location signal is transmitted from a second base station and a third location signal is transmitted from a third base station, such that the first, second and third location signals each include a distinct characteristic identifying the corresponding base station, wherein each of the first, second and third base stations at least partially suspend wireless communications for the particular time interval during which the location signals are transmitted.

24. The mobile station of claim 23 wherein the first, second and third location signals are configured to appear mutually orthogonal at the mobile station.

25. The mobile station of claim 23 wherein the first, second and third location signals have substantially non-overlapping comb-like frequency spectra.

26. The mobile station of claim 22 wherein the particular time interval during which the location signals is transmitted has a duration of about 1 ms to about 100 ms.

27. The mobile station of claim 22 wherein the location signal includes a predetermined waveform carrying no additional information other than that provided by the waveform itself.

28. The mobile station of claim 22 wherein the location signal has a comb-like frequency spectrum.

29. The mobile station of claim 22 wherein the location signal occupies a bandwidth normally occupied by multiple channels of the wireless system.

30. A wireless communication system comprising:
   at least one mobile station; and
   a plurality of base stations, including at least one base station for transmitting a location signal, wherein the location signal is transmitted during a particular time interval for at least a portion of which each of two or more of the plurality of base stations at least partially suspends wireless communications, such that the at least partial suspension of wireless communications facilitates detection of the location signal, and such that the mobile station can detect the location signal to generate information for estimating the location of the mobile station.

31. The system of claim 30 wherein during the particular time interval a first location signal is transmitted from a first base station, a second location signal is transmitted from a second base station and a third location signal is transmitted from a third base station, such that the first, second and third location signals each include a distinct characteristic identifying the corresponding base station, wherein each of the first, second and third base stations at least partially suspend wireless communications for the particular time interval during which the location signals are transmitted.

32. The system of claim 31 wherein the first, second and third location signals are configured to appear mutually orthogonal at the mobile station.

33. The system of claim 31 wherein the first, second and third base stations suspend all wireless communications with mobile stations of the system for the time interval during which the location signals are transmitted.

34. The system of claim 31 wherein the first, second and third location signals have substantially non-overlapping comb-like frequency spectra.

35. The system of claim 30 wherein the particular time interval during which the location signal is transmitted has a duration of about 1 ms to about 100 ms.

36. The system of claim 30 wherein the location signal includes a predetermined waveform carrying no additional information other than that provided by the waveform itself.

37. The system of claim 30 wherein the location signal has a comb-like frequency spectrum.

38. The system of claim 30 wherein the location signal occupies a bandwidth normally occupied by multiple channels of the wireless system.

* * * * *